March 3, 1942.  F. P. LAWLER  2,274,904
TRAIL BUILDER ATTACHMENT FOR TRACTORS
Filed Aug. 14, 1939  7 Sheets-Sheet 1

Fig. 1

FRANK P. LAWLER,
INVENTOR.

BY

ATTORNEY

March 3, 1942. F. P. LAWLER 2,274,904
TRAIL BUILDER ATTACHMENT FOR TRACTORS
Filed Aug. 14, 1939 7 Sheets-Sheet 4

Fig. 5

FRANK P. LAWLER,
INVENTOR.
BY
ATTORNEY

March 3, 1942.   F. P. LAWLER   2,274,904
TRAIL BUILDER ATTACHMENT FOR TRACTORS
Filed Aug. 14, 1939   7 Sheets-Sheet 6

FRANK P. LAWLER,
INVENTOR.
BY
ATTORNEY

Patented Mar. 3, 1942

2,274,904

UNITED STATES PATENT OFFICE 2,274,904

TRAIL BUILDER ATTACHMENT FOR TRACTORS

Frank P. Lawler, Huntington Park, Calif., assignor, by mesne assignments, to The Buckeye Traction Ditcher Company, Findlay, Ohio Application August 14, 1939, Serial No. 290,094

19 Claims. (Cl. 37—144)

My invention relates to earth moving devices of the type having a tool or blade carried by a vehicle so as to be brought into engagement with the earth material while the vehicle is propelled, and relates in particular to a simple and rugged attachment which may be readily applied to tractors.

In the preferred form of the device, a pusher blade is secured in operative position at the front end of the tractor so as to serve as a means for pushing a body of earth material ahead of the tractor or to serve as a scraper to scrape off a portion of the ground ahead of the tractor. It is found that in the use of tractors with many devices of this character, full pushing efficiency of the tractor is not attained for the reason that the addition of the ground working equipment to the tractor produces a structure having a center of gravity near the front ends of the tractor treads, with a result that excessive wear is imposed on the front rollers or bearings for the chain tread.

It is an object of the present invention to provide a tractor with ground working means projecting forwardly from the tractor, such ground working means being so proportioned and positioned that the resulting structure of tractor and attachment has a center of gravity shifted but little forward of the central transverse plane of the tractor tread elements. This relieves the front ends of the tread structures from excessive wear, and makes possible the obtaining of maximum pushing force by the tractor for the reason that the tread chains maintain maximum engagement with the surface of the ground.

It is a further object of the invention to have the pusher blade or mold board of the tractor attachment adjustably mounted by means of a universal joint so that this pusher blade may have a variety of positions of adjustment, and it is a further object of the invention to provide a device of this character having simple means for rigidly securing the pusher blade in any of its positions of adjustment.

It is an object of the invention to provide an attachment for a tractor having a pusher blade mounted at the forward end of a thrust member which is adjustably secured to the tractor, this pusher blade being tilted on a substantially horizontal axis extending longitudinally of the tractor so that the pusher blade may be adjusted from a position in a horizontal plane to a position pitched relative to the horizontal plane, with supporting means for the pusher blade to hold the same rigidly in the desired position of adjustment.

It is a further object of the invention to provide an earth working attachment for a tractor having a thrust member secured to the tractor for vertical adjustment and having a front portion extending across the front of a tractor, together with a pusher blade pivotally secured to the front portion of the thrust member so as to be swung from a lateral position to an angled position, the pusher blade having a lateral channel in the rear face thereof into which the front portion of the thrust member is extendible. By use of this arrangement the distance of the pusher member from the front of the tractor is maintained at a minimum.

It is a further object of the invention to provide in the means for rigidly securing the pusher blade in its desired position of adjustment, a clamping means which may be readily applied and which will rigidly clamp the cooperating parts of the attachment. This clamping means employs a clamping screw having an enlarged tapered head to tightly engage a tapered seat formed in one of the parts to be secured together, this engagement of the head with the seat not only tightly clamping the parts together, but also cooperating as a centralizing or positioning means for bringing the cooperating parts into their respective positions of operation in response to the engagement of the tapered head with the tapered seat.

It is a further object of the invention to provide a ground working attachment for a tractor having supports mounted on the tread elements of the tractor so as to move up and down with these tread elements as the tread elements adjust themselves to the surface contour of the ground over which the tractor is being driven, and equalized lifting means mounted on the supporting members, to accomplish raising and lowering of the ground engaging element of the attachment, and to provide in conjunction with the equalized lifting means an equalizing attachment of sensitive or fast acting character to connect the lifting means to the supporting part of the attachment which carries the ground engaging member represented by the pusher blade. his sensitive equalizing means compensates for the sudden changes in position of the tread elements.

It is a further object of the invention to provide an attachment for a tractor which may be readily converted from hydraulic control to cable control, by the mere substitution of hydraulic control means or cable control means for the other, without the necessity of changing the thrust member, pusher blade or supports which are secured to the tread elements of the tractor so as to transmit the dead weight of the attachmen directly to the tread element.

It is a further object of the invention to provide a simple and rugged hydraulic lift means for each of the supports. which hydraulic lift means are detachably secured to the supports in operative position by means of a pair of lock pins for each of the lifting means.

Further objects and advantages of the invention will be brought out in the following part of the specification.

Referring to the drawings which are for illustrative purposes only.

Reference is hereby made to my co-pending application Serial No. 290,093 in which certain of the subject matter shown herein is claimed.

In the practice of my invention I prefer to employ a tractor 20 of the caterpillar or track laying type, such as shown in Figs. 1 to 7 of the drawings. This tractor 20 has at the sides thereof tread elements 21, each comprising a chain belt 22 in the form of a horizontally elongated loop and means for supporting and driving the chain belt 22, consisting of a drive sprocket 23 disposed at the rear end of the tractor and an idler sprocket or wheel 24 spaced forwardly of the sprocket 23 and being connected to the sprocket 23 by means of an internal supporting structure 25 including a horizontal beam 26. Such tractors have an engine 20a disposed forwardly thereon, with suitable transmission to deliver driving power through the sprockets 23 to the chain belt 22 of the tread elements 21. As a tractor of this type is propelled over uneven ground, the forward portions of the tread elements 21 swing vertically on the axes defined by the sprockets 23.

Figure 1:
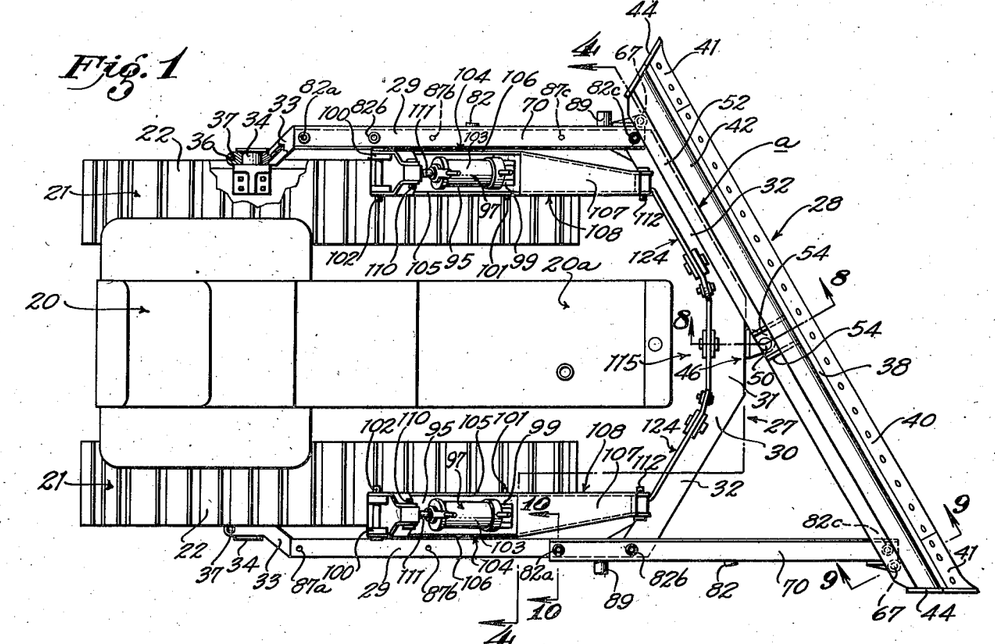
Fig. 1 is a preferred embodiment of my invention, shown in a plan view with a tractor with which it cooperates.
Figure 5:
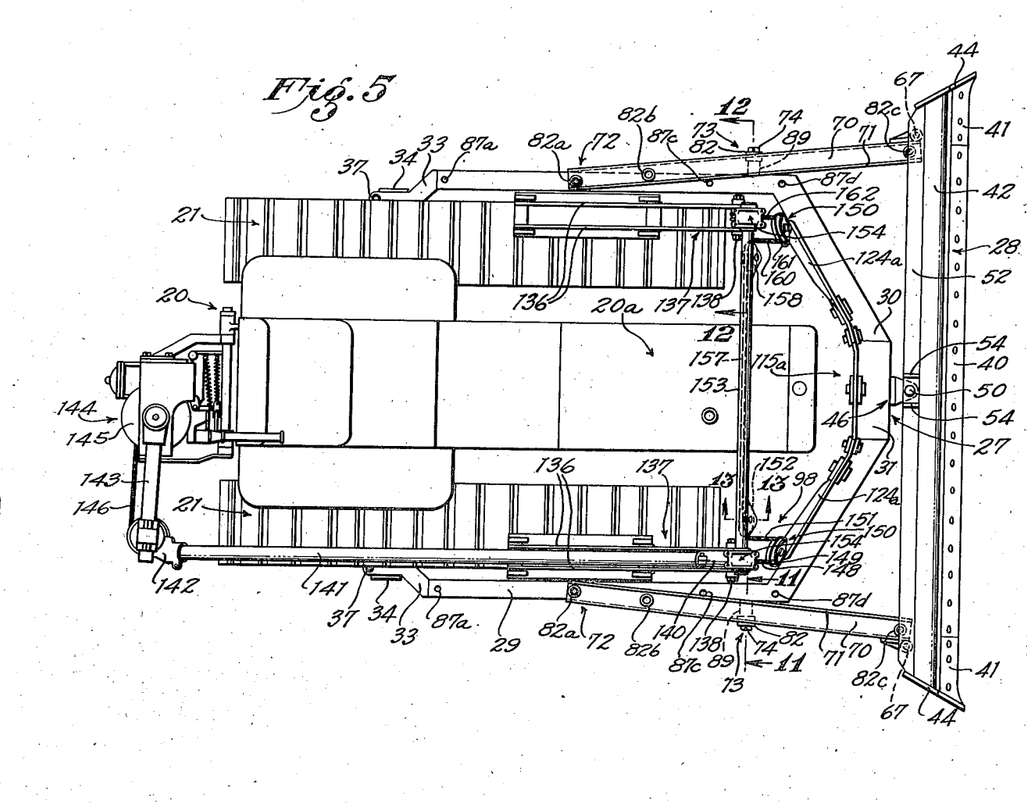
Fig. 5 is a plan view showing a form of my invention wherein a cable is employed in the control means for raising and lowering the working elements.

My attachment comprises a thrust member 27 which is of general U-shaped form, and supports thereon a ground engaging or ground working member 28 ordinarily in the form of a pusher blade, this pusher blade 28 being adjustably mounted so that it may be swung from an angled position, such as that in which it is shown in Fig. 1, to a lateral, or bulldozer position, as shown in Fig. 5.

Figure 2:
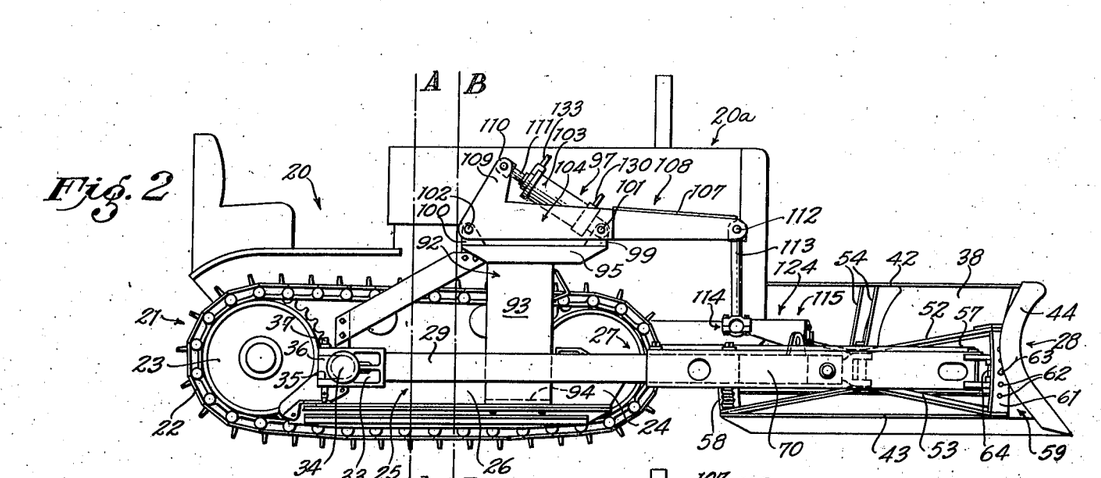
Fig. 2 is a side elevation corresponding to Fig. 1.

The thrust member 27 comprises a pair of hollow side arms 29, which extend along the sides of the tractor 20, and a cross-member 30 rigidly secured to the front ends of the side arms 29 in position to extend across the front of the tractor at a minimum distance from the front end of the tractor. The cross-member 30 has a central portion 31 and a pair of rearwardly sloping portions 32, all of which are preferably of hollow cross-section. The side arms 29 are of such length that the rear ends thereof may be connected by means of fittings 33 to pivots 34 consisting of pins which project outwardly from the rearward portions of the tread elements 21. As shown in Fig. 2, the fittings 33 have rearwardly faced notches 35 therein, to receive the pins 34, the rear ends of the notches 35 being closed by blocks 36 which are secured in position by vertical pins 37. The thrust member 27, and the parts secured thereto, may be readily detached from the tractor 20 by lifting the pins 37 and removing the blocks, which will permit movement of the thrust member 27 in forward direction to carry the fittings 33 out of engagement with the pivot pins or trunnions 34. The thrust member 27 may be readily mounted on the tractor by a reversal of the foregoing procedure.

Figures 8, 9:
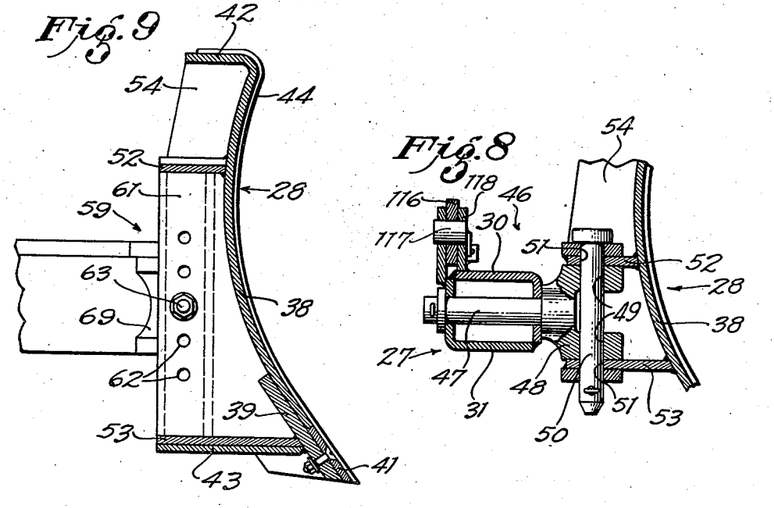
Fig. 8 is an enlarged fragmentary cross-section taken as indicated by the line 8—8 of Fig. 1.
Fig. 9 is an enlarged cross-section on the vertical plane indicated by the line 9—9 of Fig. 1.

The pusher blade 28, sometimes referred to as the mold board, is of such character that as it is moved forward in the lowered position in which it is shown in Fig. 2, it will roll ahead of it the earth material which is being moved. As best shown in Figs. 1 and 9, the pusher blade 28 includes a curved plate 38 which is welded to and extends upwardly from a backing plate 39, the lower portion of which carries a replaceable knife 40 and replaceable corner bits 41 of chilled steel. The upper edge portion of the plate 38 is bent rearwardly to form a horizontal flange 42 and a horizontal bottom plate 43 is projected rearwardly from the backing plate 39 and extends full length of the backing plate, so as to connect vertical end plates 44.

Figure 3:
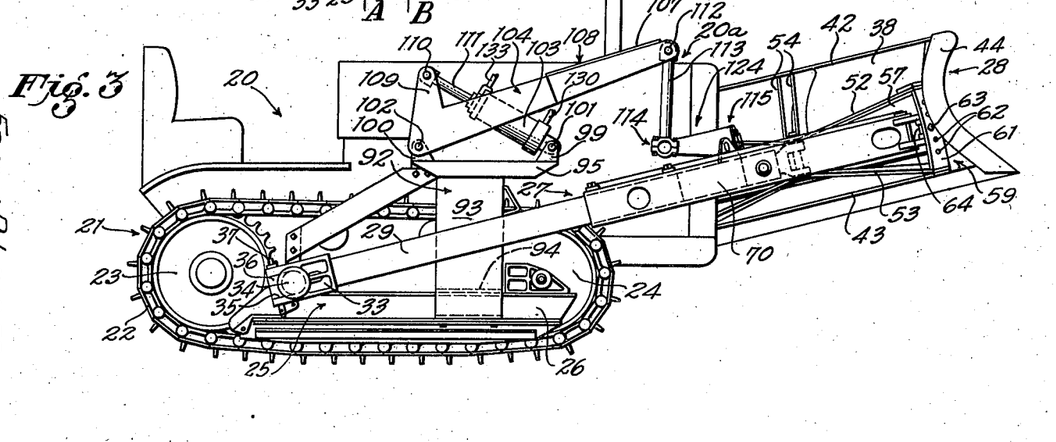
Fig. 3 is a side elevation showing the attachment in raised position.

As shown in Figs. 1 and 8, a universal joint 45 connects the central portion of the pusher blade 28 to the central portion 31 of the thrust member 27. Such universal joint 46 comprises a horizontal pin 47 which extends through the central portion 31 of the cross-member 30 and has a head 48 of furcated form, with aligned openings 49 to receive a substantially vertical pin 50 which is passed through openings 51 in spaced plates 52 and 53, which project rearwardly from the plate 38 above the bottom plate 43, as shown in Figs. 2 and 3. Vertical bracing plates 54 are welded to the back of the plate 38 in positions above the central portion of the plate 52, and in a position straddling the head of the pin 50.

The plates or ribs 52 and 53 diverge outwardly from the central portions of the pusher blade 28, so that the ends of these plates 52 and 53 are vertically spaced a greater distance apart than are the central portions thereof. As shown in Figs. 2, 3, and 9, adjustable means 59 are provided for connecting the forward ends of members 70 to the end portions of the pusher blade 28. The plates 52 and 53 form channels 57 in the back of the pusher blade 28, which channels 57 increase in vertical dimension from the center of the pusher blade toward the ends thereof, and in the ends of these channels 57 essentially vertically disposed arcuate walls 61 are secured. The walls 61 each have a plurality of openings 62 spaced vertically through which openings a bolt 63 may be selectively passed to clamp a connector body 64 to the wall 61. The connector body 64 is shown as a block having horizontally projecting walls 66 through which a pivot pin 67 is passed, this pin also passing through openings 68 in a bracket 69 which is welded to the front end of an extension 70.

Figure 10:
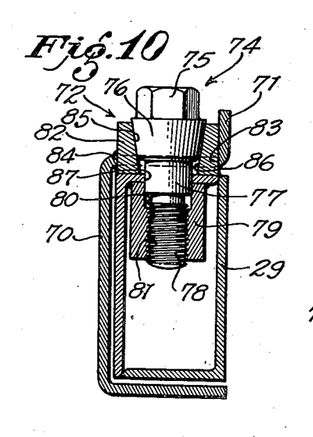
Fig. 10 is an enlarged cross-section taken on the plane indicated by the line 10—10 of Fig. 1.
Figure 11:
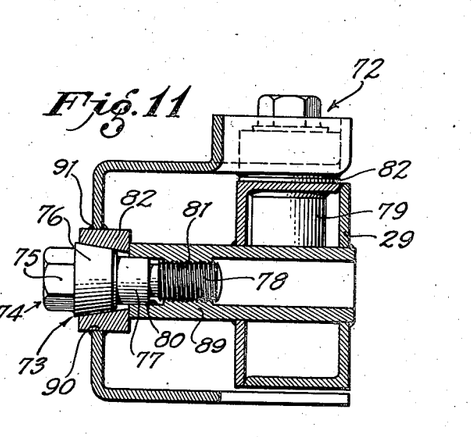
Fig. 11 is an enlarged cross-section taken on the plane indicated by the line 11—11 of Fig. 5.

There are a pair of these extensions 70, as shown in Figs. 1 and 5, such extensions 70 being adjustable on the side arms 29 of the thrust member 27 so as to extend forwardly in different positions to rigidly carry the pusher blade 28 in angled position, lateral position, and/or pitched position. As best shown in Figs. 10 and 11, each extension 70 comprises a channel bent from sheet steel so as to fit over a side arm 29. The channel forming the extension 70 has the top and bottom walls thereof stiffened by vertically projecting flanges 71. The invention provides a simple means for clamping the extension 70 in desired positions of adjustment on the side arms 29. The invention employs two different forms of this clamping means, as shown at 72 and 73 in Fig. 5. The clamping means 72 are vertically disposed; whereas, the clamping means 73 are horizontally disposed. As shown in Figs. 10, and 11, each of these clamping means 72 and 73 employs a screw 74, so that such screws 74 may be used interchangeably. Each screw 74 has a head 75 with a downwardly converging conical face 76 coaxial with a cylindrical barrel 77 and a threaded stem 78. The clamping means 72 has a body 79 with an upper cylindrical bore 80 and a lower threaded bore 81, the bore 80 being of a size to make a relatively close working fit with the barrel 77 of the screw 74, and the threaded bore 81 being adapted to receive the threaded stem 78. A wall or body 82 is welded into an opening 83 in the upper wall 84 of the channel forming the extension 70, this wall 82 having a conical seat 85 to cooperate with the face 76 of the head 75. The opening 86 through the body 82 is larger than the opening 87 in the top of the side arms 29, which opening 87 communicates and is coaxial with the bore 80 of the threaded body 79.

One of the features of this clamping means 72 is that the alignment of the cooperating parts may be readily obtained. For example, with the threaded body 79 in place in the side arm 29, the body 82 may be placed on the upper surface of the side arm 29, and the clamping screw 74 may be screwed tightly into place. The extension 70, with the opening 86 therein slightly oversize, may be placed in position, as shown in Fig. 10, and the securing weld 88 may be made.

The clamping means 73 includes a sleeve 89 welded in the arm 29 near the forward end thereof in a position to project outwardly therefrom in a horizontal plane, this sleeve having in the outer end thereof a cylindrical bore 80, and a coaxial threaded bore 81. In assembling the co-operating parts of the clamping means 73, a collar or body 82 is secured against the outer end of the sleeve 89 by means of a clamping screw 74. The extension 70 is then placed in intermediate position, as shown in Fig. 5, with the collar 82 projecting through an opening 90 in the side wall thereof, and the securing weld 91 is applied.

A feature of the invention is that each extension 70 is rigidly secured to its cooperating side arm 29 by a pair of securing means. When the pusher blade 28 is in lateral, or bulldozing position, as shown in Fig. 5, securing means 72 and 73 are employed in spaced relation. When the pusher blade 28 is in this laterally extended position, the extensions 70 diverge so that when the rear end of each extension 70 lies close to a side arm 29, the intermediate portion of the extension 70 will be spaced from the side arm, but will be rigidly connected to the forward portion of the side arm by means of the sleeve 89 and its cooperating clamping screw 74, as shown in Fig. 11. Each side arm 29 has only one sleeve 89, but has in the top face thereof four openings 87 as indicated at 87a, 87b, 87c, and 87d in Figs. 1 and 5, each of these openings 87 leading into a threaded body 79 of the character shown in Fig. 10. Each extension 70 has three of the collars 82 mounted in the upper wall thereof, as indicated at 82a, 82b, and 82c. When the pusher blade 28 is in bulldozing position, as shown in Fig. 5, screws 74 are passed through the collars 82 in the sides of the extensions 70 into the sleeve 89, and a screw 74 is passed through the collar 82a at the rear end of each extension 70 into an opening 87b in the cooperating side arm 29. When the pusher blade 28 is in either of its angled positions, as shown in Fig. 1, screws 74 will be passed through collars 82a and 82b into openings 87c and 87d, and in the other extension 70 screws 74 will be passed through the collars 82a and 82c into openings 87a and 87d. In each instance the extensions 70 will be rigidly secured by pairs of clamping screws.

Figure 6:
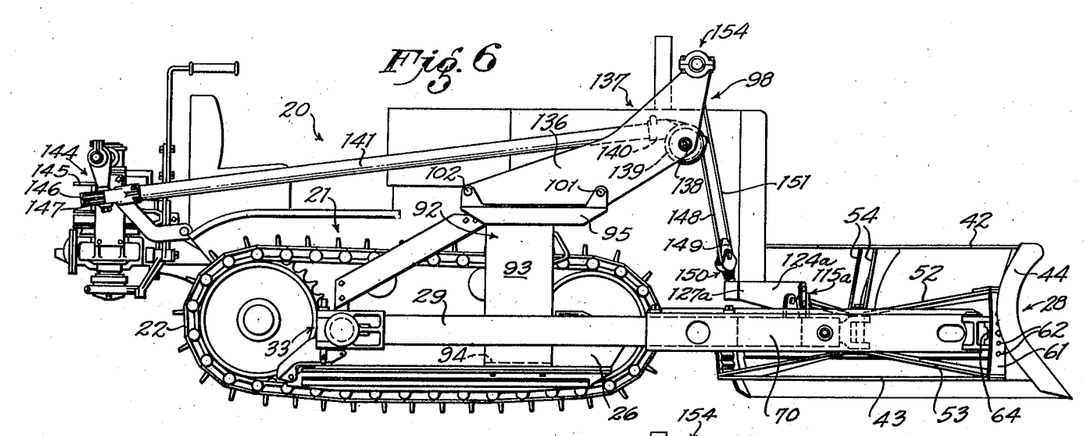
Fig. 6 is a side elevation of the device shown in Fig. 5, but with the pusher blade in angled position.
Figure 7:
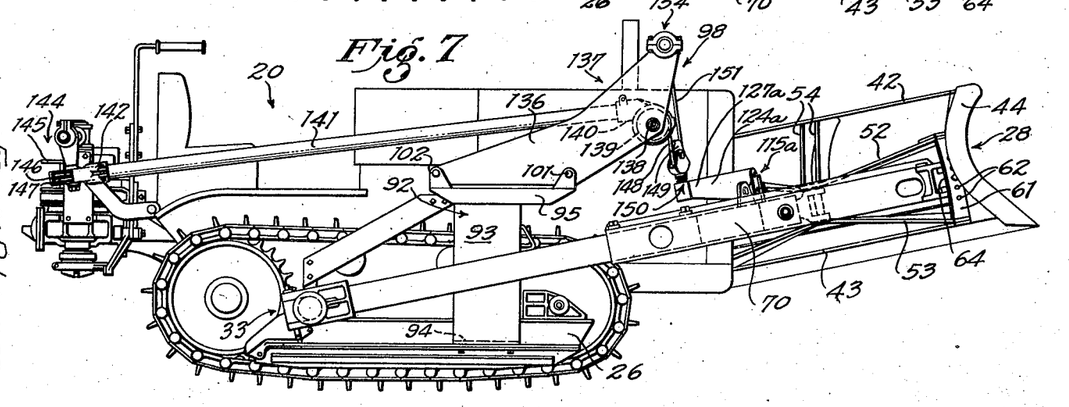
Fig. 7 is a side elevation similar to Fig. 6, but showing the pusher blade raised.

For the support of the front end of the thrust member 27 and its pusher blade 28, I provide supporting members 92 mounted on the tread elements 21 so as to transmit the load of the forward portion of the attachment directly to the tread elements and thence to the ground, without placing strains on the body castings of the tractor 20. It is a feature of the invention that different types of lift means may be selectively employed with the thrust member 27, pusher blade 28, and supports 92. Towards this end the supporting members 92 each have a post structure 93, the lower portion of which is bolted, as at 94, to the internal supporting structure 25 of a tread element. At the upper end of each post 93 there is a horiontal portion or member 95, preferably made from a channel with its flanges pointed downward so that the web 96 thereof will form a substantially horizontal table to carry detachable securing means for the selected lifting device, which may be a hydraulic type lifting device 97, as shown in Figs. 1 to 4, or a cable type lifting device 98, as shown in Figs. 5 to 7 inclusive.

The horizontal portion 95 of each post 93 has front attachment means comprising a pair of spaced fins or lugs 99, and rear attachment means comprising a pair of upwardly extending fins 100, these fins 99 and 100 being respectively drilled to receive horizontal pins 101 and 102. In the use of the hydraulic type of lift means 97, shown in Figs. 1 to 4, the front pins 101 support the front ends of double acting power cylinders, and the pins 102 support bellcrank members 104 each comprised of laterally spaced plates 105 and 106 bridged by a plate 107 which is welded in place. Each pair of plates 105 and 106 straddles a power cylinder 103, and such plates are cut so as to form a relatively long, forwardly extending lever 108, and a relatively short upwardly extending lever 109. Each lever 109 carries a transverse pin 110 to which a piston rod 111, associated with a power cylinder 103, is connected so that when fluid pressure is applied to the power cylinder 103, the lever 104 may be caused to swing on the pivot represented by the pin 102.

Figure 4:
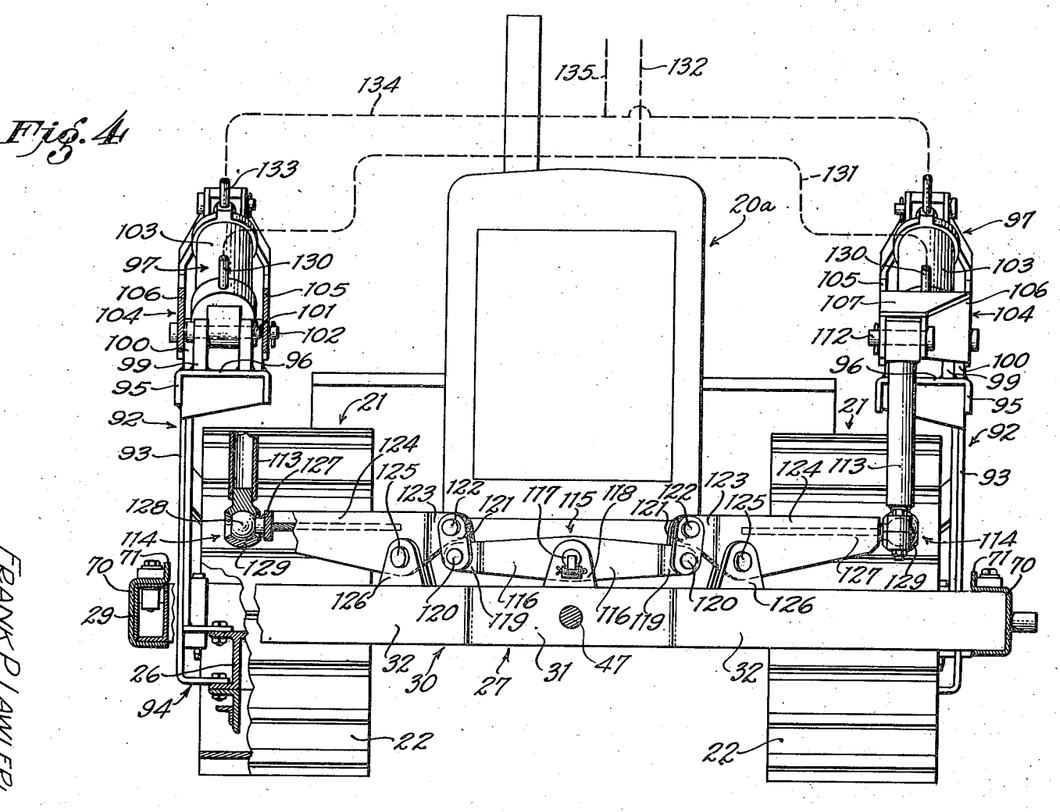
Fig. 4 is an enlarged cross-sectional view taken substantially as indicated by line 4—4 of Fig. 1, so that some parts are shown partly sectioned and others are shown in elevation.

The front end of each long lever 108 carries a transverse pin 112 from which a connecting rod 113 extends downwardly. Each connecting rod 113 has pivot means 114 at its lower end for connection to an end of an equalizer 115 which is mounted on the rearward portion of the upper face of the cross-member 30. As best shown in Fig. 4, the equalizer 115 comprises a central link 116, fulcrumed at its center by means of a pin 117, supported by webs 118 which project upwardly from the central portion 31 of the cross-member 30. The ends 119 of the member 115 are bent rearwardly at a relatively small angle, and pins 120 supported therein are connected by means of links 121 with pins 122 carried at the inner ends 123 of outer levers 124 which are fulcrumed on pins 125 carried by fins 126, which project upwardly from the rearwardly sloping portions 32 of the cross-member 30. The pins 125 are positioned near the inner ends 123 of the levers 124, so that the outer ends 127 of the levers 124 will swing to a greater distance for a given arc of rotation than will the inner ends 123 thereof. As also shown in Fig. 4, the outer end 127 of each lever 124 has a ball 128 mounted thereon to form part of a pivotal connection 114, the cooperating portion of which comprises a split socket 129 connected to the lower end of the connecting rod 113.

The lift means provided by the invention has slow acting equalizing means represented by the power cylinders 103, and fast acting, sensitive equalizing means consisting of the equalizer 115. As shown in Fig. 4, the fluid inlets 130 to the cylinders 103 are connected through conduits 131 with a fluid pressure line 132, and the outlets 133 of the power cylinders 103 are connected to conduits 134 with a fluid line 135, the ducts 132 and 135 being connected with a suitable valve and source of fluid and reservoir, not shown for the reason that the same may be in accordance with standard hydraulic practice. Owing to the fact that the cylinders 103 are interconnected, there may be an equalizing flow of fluid therebetween as the supports 92 are raised and lowered due to the travel of the tread element 21 over uneven ground. This equalizing action will be relatively slow, but the compensation of the equalizer 115 for changes in relative positions of the tread elements 21 will be substantially instantaneous, and the weight of the pusher member 30 and the blade 28 will be always substantially equally distributed between the two supporting members 92.

Figures 12, 13:
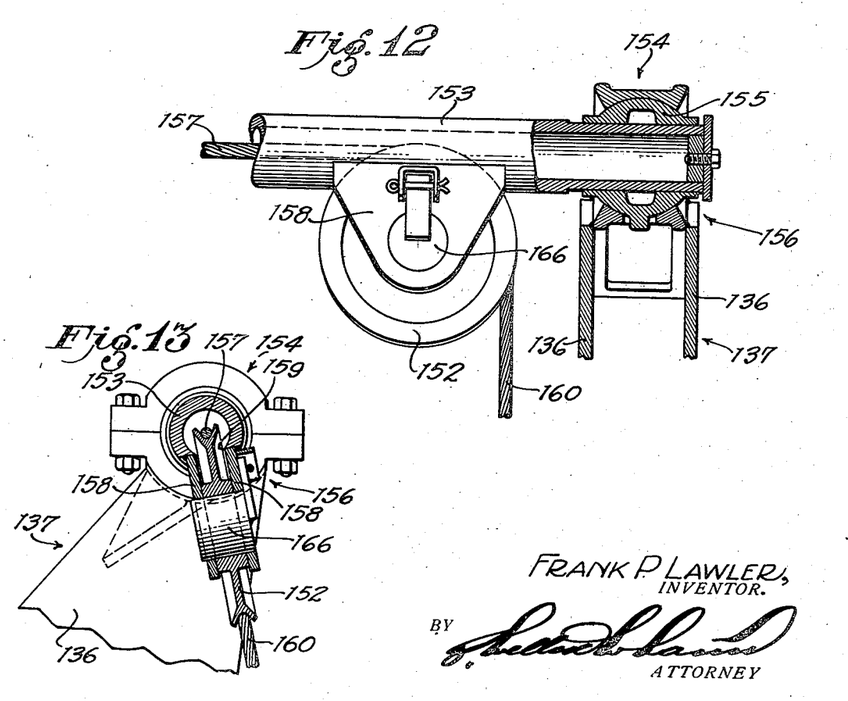
Fig. 12 is an enlarged fragmentary cross-section taken as indicated by the line 12—12 of Fig. 5.
Fig. 13 is an enlarged fragmentary section taken as indicated by the line 13—13 of Fig. 5.

As shown in Figs. 5, 6, and 7, the cable type lift means 98 may be readily substituted for the hydraulic lift means 97, this cable type of lift means being connected to the upper portion 95 of each support 92 by the pins 101 and 102, and pairs of plates 136 are placed in spaced relation to form arms 137 which project upwardly and forwardly from the supporting members 92. The pins 101 and 102 pass through the lower portions of the plates 136, thereby securing the same rigidly to the table portions 95 of the supporting members 92. Across the forward portion of each pair of plates 136, a shaft or bolt 138 is extended. On one of these bolts 138, as shown in Figs. 6 and 7, a sheave 139 is mounted, and from a casing 140 which surrounds this sheave 139 and is pivoted on the shaft 138, a cable tube 141 extends rearwardly to a sheave casing 142 which is pivotally mounted at the outer end of an arm 143 extending laterally from a cable winch 144, preferably mounted at the rear end of a tractor. From the cable drum 145 of this winch 144, as shown in Fig. 5, a cable 146 is carried around a sheave 147 supported in the casing 142 into the tube 141 through which it is carried to the sheave 139. The cable extends over the sheave 139 and a portion 148 thereof drops down to a sheave 149 supported by means of a fitting 150 at the outer end 127a of a lever 124a forming a part of an equalizer 115a which is in all respects the same as the equalizer 115 shown in Fig. 4, with the exception that the outer ends of the outer levers of such equalizer are prepared for securement of the sheave mounting 150 instead of the ball and socket joint 114 employed in conjunction with the hydraulic lift means 97. The cable is extended under the sheave 149 and a portion 151 thereof, as shown in Figs. 6 and 7, is carried up from the sheave 149 to a sheave 152, supported at an end of a spreader or connecting tube 153, which extends from the upper end of one arm 137 to the upper end of the other arm 137. This tube 153 is swivelly connected to the upper ends of the arms 137 by means of ball and socket type joints 154. As shown in Fig. 12, each joint 154 comprises a ball member 155 which is secured to an end of the tube 153, and a split socket 156 secured to the upper end of each of the cooperating arms 137. The tube 153 supports two of the sheaves 152 near the ends thereof to support a lateral extension 157 of the cable.

In the preferred practice of the invention these sheaves 152 are supported on the tube 153 by means of a shaft 166 carried by projecting plates 158, as shown in Fig. 13, and in such position that the upper portion of each sheave 152 will project into an opening 159 in the lower part of the tube 153, so that the lateral extension 157 of the cable will lie within the tube 153. From the second of the sheaves 152 a portion 160 of the cable extends down to a sheave 161 which is a counterpart of the sheave 129. This cable extends under this sheave 161 and a portion of the cable 162 is carried up to the bolt 138 at the far side of the tractor or opposite from the bolt 138 on which the sheave 139 is mounted. The downwardly hanging cable loop formed in part by the cable portions 148—151 and 160—162 cooperate with the laterally extending portions of the cable to form a primary equalizing means to compensate for vertical movement of the tread elements 21. These cable loops however are connected through the sheaves 149 and 161 with the opposite ends of the secondary, sensitive equalizing means 115a capable of giving an equalization or compensation within a small range of movement, which is relatively instantaneous, the result being that the load of the thrust member 27 and the pusher blade 28 is evenly divided between the supports 92 independently mounted on the tread elements 21.

The line A—A of Fig. 2 passes through the center of gravity of the tractor 20. This center of gravity of the tractor is ordinarily substantially intermediate the ends of the tread elements 21. The line B—B of Fig. 2 passes through the center of gravity of the earth working device consisting of the tractor and my attachment which is so designed that the center of gravity or center of pressure of the tractor tread relative to the ground is not shifted forwardly a great distance from the line A—A as the result of the adding of the attachment to the tractor. It will be noted that the pusher blade 28 is disposed at a minimum distance from the front end of the tractor 20. In order to keep this distance at a minimum, I have provided for a telescoping of the plates 52 and 53 over a sloping side portion 32 of the front member 30 when the pusher blade 28 is in angled position, as shown at a in Fig. 1. In view of the fact that the plates 52 and 53 diverge from the central portion of the pusher blade, the forward portion of the front member 30 may enter one of the channels 57 whenever the pusher blade 28 is swung into angled position, and even though the blade may be at the same time pitched relative to horizontal by the moving of the blocks or connector bodies 64 into different positions along the segments 58. The sensitive equalizer 115 does not take up space so as to increase the spacing of the pusher blade 28 from the front end of the tractor, for the reason that this equalizer 115 is mounted on the rearward portion of the upper face of the cross-member 30. The support of the pusher blade 28, in all of its positions, is rigid for the reason that the extensions 70 are rigidly clamped to the side arms 29 and the connector bodies 64 are rigidly clamped on the segments 58 which are welded in place on the back of the pusher blade 28.

It has been explained how the equalizer is constructed so as to make it possible to set the cross-member 30 of the tractor attachment relatively close to the front end of the tractor so that the overhanging weight of the attachment will be minimized, thereby making it possible to apply the attachment to a tractor without materially changing the center of gravity of the tractor treads relative to the ground. An additional feature of the equalizer construction is that the ends of the equalizer 115 bend back so that the ends of the arms 124 lie substantially under the forward ends of the lift means formed in part by the levers 104. The equalizer 115 is bent around the radiator of the tractor so that the ends of the levers 124 lie behind the vertical plane defined by the front face of the tractor radiator. Accordingly, the length of the levers 104 is minimized, and the opposite extremities of the equalizer 115 are disposed in such position that they will clear the pusher member 28 when the same is swung into angled position, as shown in Fig. 1.

Figures 14, 15:
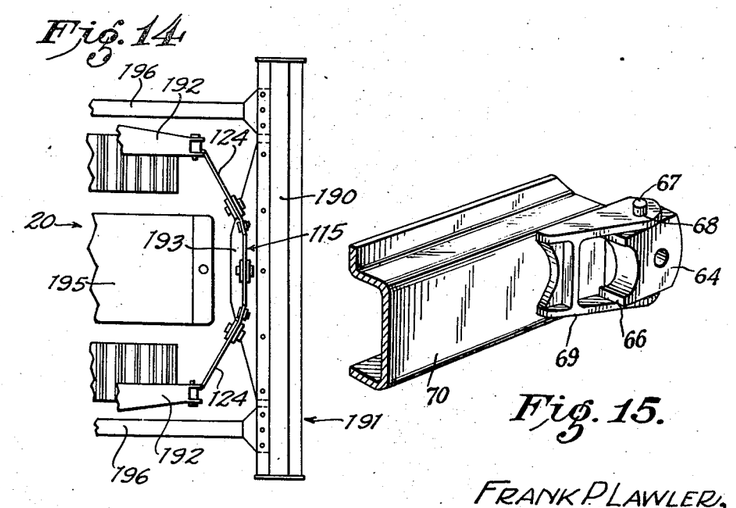
Fig. 14 is a fragmentary plan view to reduced scale showing the simple manner of applying the equalizing means to a standard bulldozer.
Fig. 15 is an enlarged fragmentary perspective view of the front end portion of one of the thrust member extensions and associated parts.

It will be understood that in many uses of the invention the cross-member 30 and the pusher member 28 may be rigidly secured together or formed as one part, as in bulldozers wherein the side arms of the bulldozer attachment are connected directly to the mold board and extend rearwardly therefrom. In Fig. 14 I show the sensitive equalizer 115 as a means for connecting the mold board 190 of a bulldozer attachment 191 to lift members 192 which may be levers such as the levers 104 of a hydraulic lift means. The equalizer 115 is secured to a lateral plate 193 forming part of the mold board 190 and the levers 124 of the equalizer 115 bend rearward so as to encompass the radiator 195 at the front of the tractor. The mold board 190 is connected to the tractor 20 so that it may have substantially vertical movement by means of side arms 196 which are connected directly to the end portions of the mold board 190, thereby avoiding the use of a separate cross-member such as the member 30, shown in Fig. 1.

I have herein disclosed a simple and practical form of my invention, but it is recognized that various parts or elements thereof may be replaced by other parts or elements of equivalent function without departing from the spirit of the invention; therefore, the invention is not limited to the details of construction shown herein but has the scope of the appended claims.

I claim as my invention:

1. In an attachment for use with a tractor of the character described having tread elements at the sides thereof, the combination of: a ground engaging member; means for connecting said ground engaging member to said tractor so that it may be raised and lowered; equalizing means carried by said tread elements and being operative to apply a force to lift said ground engaging member; and sensitive equalizing means connecting said first named equalizing means to said ground engaging member, said equalizing means compensating for the movement of said tread elements relative to said ground engaging member as said tread elements move over uneven ground.

2. In an attachment for use with a tractor of the character described having tread elements at the sides thereof, the combination of: a ground engaging member; means for connecting said ground engaging member to said tractor so that it may be raised and lowered; and supporting means for said ground engaging member connected to both of said tread elements so that the weight of said ground engaging member will be substantially equally divided between said tread elements, said supporting means comprising a slow acting hydraulic equalizing means and a fast acting mechanical equalizing means connected in the parallel.

3. In an attachment for use with a tractor of the character described having tread elements at the sides thereof, the combination of: a ground engaging member; means for connecting said ground engaging member to said tractor so that it may be raised and lowered; and supporting means for said ground engaging member connected to both of said tread elements so that the weight of said ground engaging member will be substantially equally divided between said tread elements, said supporting means comprising a slow acting equalizing means and a fast acting mechanical equalizing means connected in the parallel, said last named equalizing means comprising a central lever fulcrumed on said ground engaging member, outer levers fulcrumed on said ground engaging member, means providing a pivotal connection between the inner ends of said outer levers and said central lever, and means connecting the outer ends of said outer levers to said first named equalizing means.

4. In an attachment for use with a tractor of the character described having tread elements at the sides thereof, the combination of: a ground engaging member; means for connecting said ground engaging member to said tractor so that it may be raised and lowered; a lift means on each side of said tractor; and equalizing means connecting said lift means to said ground engaging member so that the weight of said ground engaging member will be substantially equally divided between said lift means, said equalizing means comprising a central lever fulcrumed on said ground engaging member, outer levers fulcrumed on said ground engaging member so that the outer ends thereof will lie to the rear of the inner ends thereof and substantially directly below the forward portions of said lift means, means providing a pivotal connection between the inner ends of said outer levers and said central lever, there being means connecting the outer ends of said outer levers and said lift means.

5. In an attachment for use with a tractor of the character described having tread elements at the sides thereof, the combination of: a ground engaging member; means for connecting said ground engaging member to said tractor so that it may be raised and lowered; a lift means on each side of said tractor; and equalizing means connecting said lift means to said ground engaging member so that the weight of said ground engaging member will be substantially equally divided between said lift means, said equalizing means comprising a central lever fulcrumed on said ground engaging member, outer levers fulcrumed on said ground engaging member, means providing a pivotal connection between the inner ends of said outer levers and said central lever, and means connecting the outer ends of said outer levers to said lift means.

6. In an attachment for use with a tractor of the character described having tread elements at the sides thereof, the combination of a thrust member comprising a pair of side arms to extend along the sides of the tractor and a cross-member connected to the front portions of said side arms in position to extend across the front of the tractor; a pusher blade secured to the forward portion of said thrust member; a supporting member mounted on each of said tread elements of the tractor so as to rise and fall therewith as the tractor moves along; cable means for lifting said pusher blade and said thrust member, mounted on said supporting members so as to have a portion of the cable lift means extending downward from each of said supporting members; a pair of levers fulcrumed on said thrust members; an equalizing element connecting one end of one of said levers to one end of the other of said levers; and means connecting the remaining ends of said levers respectively to said downwardly extending portions of said cable lift means.

7. In an attachment for use with a tractor of the character described having tread elements at the sides thereof, the combination of a thrust member comprising a pair of side arms to extend along the sides of the tractor and a cross-member connected to the front portions of said side arms in position to extend across the front of the tractor; a pusher blade secured to the forward portion of said thrust member; a supporting member mounted on each of said tread elements of the tractor so as to rise and fall therewith as the tractor moves along; cable means for lifting said pusher blade and said thrust member, mounted on said supporting members so as to have a portion of the cable lift means extending downward from each of said supporting members; a centrally pivoted lever mounted on the central portion of the cross-member; outer levers fulcrumed on said thrust member adjacent the ends of said centrally pivoted lever; means connecting the inner end of each of said outer levers to the adjacent end of said centrally pivoted lever so that movement of one of said outer levers will cause a movement of the other of said outer levers in the opposite direction; and means for connecting the outer ends of said outer levers respectively to said downwardly extending portions of said cable lift means.

8. In an attachment of the character described for use with a tractor having tread elements at the sides thereof, the combination of a thrust member carrying ground engaging means supported so as to have vertical movement relative to the tractor, said thrust member having a cross-member which extends across the front end of the tractor; a supporting member mounted on each of said tread elements of the tractor so as to rise and fall therewith as the tractor moves along; cable lift means for said thrust members supported in part by each of said supporting members and having a portion extending downwardly from each of said supporting members; a pair of levers fulcrumed on said thrust member; an equalizing element connecting one end of one of said levers to one end of the other of said levers; and means connecting the remaining ends of said levers respectively to said downwardly extending portions of said cable lift means.

9. In an attachment of the character described for use with a tractor having tread elements at the sides thereof, the combination of a thrust member carrying ground engaging means supported so as to have vertical movement relative to the tractor, said thrust member having a cross-member which extends across the front end of the tractor; a supporting member mounted on each of said tread elements of the tractor so as to rise and fall therewith as the tractor moves along; cable lift means for said thrust members supported in part by each of said supporting members and having a portion extending downwardly from each of said supporting members; a centrally pivoted lever mounted on the central portion of the cross-member; outer levers fulcrumed on said thrust member adjacent the ends of said centrally pivoted lever; means connecting the inner end of each of said outer levers to the adjacent end of said centrally pivoted lever so that movement of one of said outer levers will cause a movement of the other of said outer levers in the opposite direction; and means for connecting the outer ends of said outer levers respectively to said downwardly extending portions of said cable lift means.

10. In an attachment for use with a tractor of the character described, having tread elements at the sides thereof, the combination of a thrust member, carrying a ground engaging member, supported on the tractor so as to have rising and lowering movement relative to the tractor; a supporting member mounted on each of said tread elements of the tractor so as to rise and fall therewith as the tractor moves over uneven ground; means for guiding a cable from one of said supporting members to the other and to direct portions of said cable down from each of said supporting members toward said thrust member; a spreader member extending over said tractor and connecting said supporting members together; sensitive equalizing means connecting said portions of said cable to said thrust member; and means for moving said cable so as to transmit to said thrust member through said equalizing means movement to raise said thrust member.

11. In an attachment for use with a tractor of the character described, having tread elements at the sides thereof, the combination of a thrust member, carrying a ground engaging member, supported on the tractor so as to have rising and lowering movement relative to the tractor; a supporting member mounted on each of said tread elements of the tractor so as to rise and fall therewith as the tractor moves over uneven ground; cable actuating means mounted on said tractor; a cable extending from said cable actuating means to one of said supporting members; means to guide the cable across the tractor to the other of said supporting members; guide means whereby said cable is formed into loops extending down from each of said supporting members; spreader means flexibly connected between said supporting members, one of the functions of said spreader means being to resist the force of tension acting in the portion of said cable which extends across from one of said supporting members to the other; and means connecting said loops of said cable to said thrust member so that the actuation of said cable by said actuating means will accomplish movement of said thrust member.

12. In an attachment for use with a tractor of the character described, having tread elements at the sides thereof, the combination of a thrust member, carrying a ground engaging member, supported on the tractor so as to have rising and lowering movement relative to the tractor; a supporting member mounted on each of said tread elements of the tractor so as to rise and fall therewith as the tractor moves over uneven ground; cable actuating means mounted on said tractor; a cable extending from said cable actuating means to one of said supporting members; means to guide the cable across the tractor to the other of said supporting members; guide means whereby said cable is formed into loops extending down from each of said supporting members; spreader means flexibly connected between said supporting members, one of the functions of said spreader means being to resist the force of tension acting in the portion of said cable which extends across from one of said supporting members to the other; and independent equalizing means mounted on said thrust member, said equalizing means connecting said loops of said cable to said thrust member so that the actuation of said cable by said actuating means will accomplish movement of said thrust member.

13. In an attachment for use with a tractor of the character described, having tread elements at the sides thereof, the combination of a thrust member, carrying a ground engaging member, supported on the tractor so as to have rising and lowering movement relative to the tractor; a supporting member mounted on each of said tread elements of the tractor so as to rise and fall therewith as the tractor moves over uneven ground; cable actuating means mounted on said tractor; a cable extending from said cable actuating means to one of said supporting members; means to guide the cable across the tractor to the other of said supporting members; guide means whereby said cable is formed into loops extending down from each of said supporting members; spreader means flexibly connected between said supporting members, one of the functions of said spreader means being to resist the force of tension acting in the portion of said cable which extends across from one of said supporting members to the other; and independent equalizing means connecting said loops of said cable to said thrust member so that the actuation of said cable by said actuating means will accomplish movement of said thrust member, said equalizing means being of relatively sensitive character and compensating for the sudden changes in position of said treads and said supporting members mounted thereon.

14. In an attachment for use with a tractor of the character described, having tread elements at the sides thereof, the combination of a thrust member, carrying a ground engaging member, supported on the tractor so as to have rising and lowering movement relative to the tractor; a supporting member mounted on each of said tread elements of the tractor so as to rise and fall therewith as the tractor moves over uneven ground; cable actuating means mounted on said tractor; a cable extending from said cable actuating means to one of said supporting members; means to guide the cable across the tractor to the other of said supporting members; guide means whereby said cable is formed into loops extending down from each of said supporting members; spreader means flexibly connected between said supporting members, one of the functions of said spreader means being to resist the force of tension acting in the portion of said cable which extends across from one of said supporting members to the other; and independent equalizing means connecting said loops of said cable to said thrust member so that the actuation of said cable by said actuating means will accomplish movement of said thrust member, said equalizing means comprising a pair of levers pivotally mounted on said thrust member, an equalizing connection between said levers whereby movement of one of said levers in one direction will result in movement of the other of said levers in the opposite direction, and means connecting said levers respectively to said loops.

15. In an attachment for use with a tractor of the character described, having tread elements at the sides thereof, the combination of a thrust member, carrying a ground engaging member, supported on the tractor so as to have rising and lowering movement relative to the tractor; a supporting member mounted on each of said tread elements of the tractor so as to rise and fall therewith as the tractor moves over uneven ground; cable actuating means mounted on said tractor; a cable extending from said cable actuating means to one of said supporting members; means to guide the cable across the tractor to the other of said supporting members; guide means whereby said cable is formed into loops extending down from each of said supporting members; spreader means having the ends thereof flexibly connected to said supporting members, said spreader means comprising a tube with laterally directed openings near the ends thereof, the interior of said tube forming a path for a portion of said cable and there being sheaves secured to said spreader means in position to guide the cable through said openings; and means connecting said loops of said cable to said thrust member so that the actuation of said cable by said actuating means will accomplish movement of said thrust member.

16. In an attachment for a tractor of the character described having tread elements at the sides thereof which rise and wall as the tractor moves over uneven ground, the combination of a ground engaging member connected to the tractor so as to have movement in a vertical plane;

a supporting member mounted on each of said tread elements of the tractor so as to rise and fall therewith; cable actuating means; a cable extending from said cable actuating means to the first of said supporting members; a guide for said cable carried by said first supporting members so that said cable may be extended downward so as to form a first cable loop; spreader means extending over said tractor from one of said supporting members to the other, the ends of said spreader means being flexibly connected to said supporting members; a sheave disposed adjacent one end of said spreader member to receive the cable from said first loop; a second sheave disposed adjacent the other end of said spreader member to receive the cable from said first named sheave; cable engaging means secured by the second of said supporting members, said cable forming a second loop extending downwardly between said second sheave and said cable engaging means; and means carried by said ground engaging member to engage said loops so that the shortening of said loops will raise said ground engaging member.

17. In an attachment for a tractor of the character described having tread elements at the sides thereof which rise and fall as the tractor moves over uneven ground, the combination of a ground engaging member connected to the tractor so as to have movement in a vertical plane; a supporting member mounted on each of said tread elements of the tractor so as to rise and fall therewith; cable actuating means; a cable extending from said cable actuating means to the first of said supporting members; a guide for said cable carried by said first supporting member so that said cable may be extended downward so as to form a first cable loop; spreader means extending over said tractor from one of said supporting members to the other, the ends of said spreader means being flexibly connected to said supporting members; a sheave disposed adjacent one end of said spreader member to receive the cable from said first loop; a second sheave disposed adjacent the other end of said spreader member to receive the cable from said first named sheave; cable engaging means secured by the second of said supporting members, said cable forming a second loop extending downwardly between said second sheave and said cable engaging means; and equalizing means connecting said loops to said ground engaging member.

18. In an attachment for a tractor of the character described having tread elements at the sides thereof which rise and fall as the tractor moves over uneven ground, the combination of a ground engaging member connected to the tractor so as to have movement in a vertical plane; a supporting member mounted on each of said tread elements of the tractor so as to rise and fall therewith; cable actuating means; a cable extending from said cable actuating means to the first of said supporting members; a guide for said cable carried by said first supporting member so that said cable may be extended downward so as to form a first cable loop; spreader means extending over said tractor from one of said supporting members to the other, the ends of said spreader means being flexibly connected to said supporting members, and said spreader member comprising a tube having openings near the ends thereof; a first sheave disposed at one of said openings so as to receive the cable from the first loop and directing the same through the opening into said tube; a second sheave disposed at the other of said openings to receive said cable from said tube; cable engaging means secured by the second of said supporting members, said cable forming a second loop extending downwardly between said second sheave and said cable engaging member to engage said loops so that the shortening of said loops will raise said ground engaging member.

19. In an attachment for a tractor of the character described having tread elements at the sides thereof which rise and fall as the tractor moves over uneven ground, the combination of a ground engaging member connected to the tractor so as to have movement in a vertical plane; a supporting member mounted on each of said tread elements of the tractor so as to rise and fall therewith; cable actuating means; a cable extending from said cable actuating means to at least one of said supporting members; means for guiding said cable from one to the other of said supporting means and also to said ground engaging member whereby movement of said cable will accomplish movement of said ground engaging member, said guide means having a spreader member extending from one of said supporting members to the other, and guide members for the cable secured at the opposite ends of the spreader member so that a portion of the cable will be carried along said spreader member from one of said supporting members to the other; and means for connecting the cable to said ground engaging member so that movement of said cable will result in movement of said ground engaging member.

FRANK P. LAWLER.